March 12, 1940.   B. H. THURMAN   2,193,786
METHOD OF AND APPARATUS FOR FORMING AND CONDITIONING SAPONIFIED PRODUCTS
Filed Feb. 14, 1936
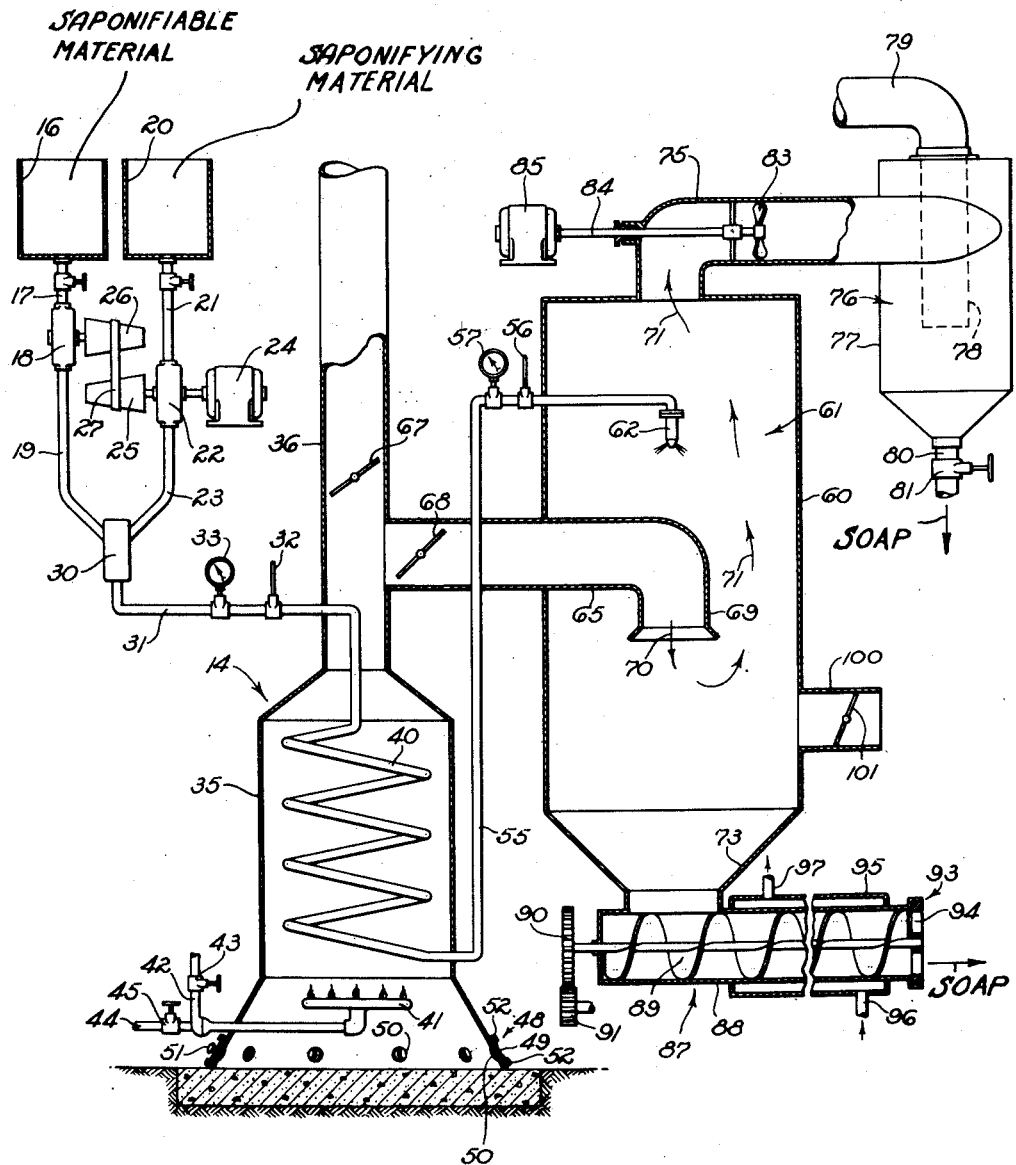
INVENTOR
BENJAMIN H. THURMAN
By
Ford W. Harris
ATTORNEY.

Patented Mar. 12, 1940

2,193,786

UNITED STATES PATENT OFFICE 2,193,786

METHOD OF AND APPARATUS FOR FORMING AND CONDITIONING SAPONIFIED PRODUCTS

Benjamin H. Thurman, Bronxville, N. Y., assignor to Refining, Inc., Reno, Nev., a corporation of Nevada Application February 14, 1936, Serial No. 63,972

23 Claims. (Cl. 260—418)

My invention relates to the forming and conditioning of saponified products. Such products result from the soap-forming reaction between a saponifiable material and a saponifying material. The saponifiable material contemplated in the present invention may include such materials as fatty acids, fats, glyceride oils, resinous materials, etc., capable of being saponified. The saponifying material contemplated in the present invention is usually an aqueous alkaline solution, which term is herein applied to aqueous solutions of various hydroxides such as sodium hydroxide, and also to aqueous solutions having an alkaline reaction, such as aqueous solutions of carbonate. Sodium carbonate is a typical example.

It is an object of the present invention to provide a novel method and apparatus for forming and conditioning a saponified product in a closed system, or, in some instances, to merely condition a saponified product in a novel manner regardless of the preliminary steps taken to form this saponified product.

One important application of the invention which will be first considered is in the spray-drying of saponified products such as soap, or other products. Present spray-drying methods require enormously large spraying chambers and a circulation of very large quantities of heated air therethrough. It is not uncommon to use a volume of air of the order of 30,000 cubic feet per minute at 475° F. for each ton of soap produced per hour. The use of heated air is preferable in spray-drying soap, for high temperatures increase the capacity of the air for holding moisture before becoming saturated. However, such heating causes expansion of the air and thus decreases the density thereof, thus limiting the quantity of mass of air which can be put through a given blower.

It is an object of the present invention to provide an improved method and apparatus for spray-drying soap and the like which requires only a fraction of the space and external energy now necessary and which can be used to effect considerable savings in heat.

It is a further object of the present invention to provide a novel method and apparatus for conditioning soap or other products out of contact with the atmosphere or with substantial amounts of oxygen. Certain saponified products react with oxygen when in a heated state to produce an inferior product. For instance, in the manufacture of certain soaps I have found that contact of these soaps when in heated condition with oxygen will form peroxides which deleteriously affect the finished product. I have found it possible to keep the particles or masses out of contact with oxygen until they have been cooled to such an extent that upon exposure to the air substantially no peroxides will be formed, the provision of a novel method and apparatus for accomplishing this end being among the objects of the present invention.

Such prevention of contact with the air or an oxygen-containing atmosphere may be accomplished by blanketing the heated masses of the saponified products during separation from the remainder of the reaction products and during cooling of these saponified products. In this instance the blanketing atmosphere in the separating zone will be substantially free of oxygen. If soap is to be formed by a continuous process, as set forth hereinafter, the saponified reaction products are continuously moved into the separating zone through any suitable discharge means such as a nozzle. The present invention comprehends a separate introduction into the separating zone of a conditioning gas, it being an object of the present invention to separately introduce such a conditioning gas into this zone. The term "gas" is herein used to include the fixed or relatively stable gases, as well as vapors and mixtures of these gaseous materials.

Particularly desirable results have been obtained by utilizing products of combustion as the conditioning gas, these products of combustion containing substantially no free oxygen. It is an important object of the present invention to supply such products of combustion to a separating zone and to remove same therefrom after these products have performed their conditioning function.

Such products of combustion may be introduced into the separating zone while in a heated condition. The temperature thereof may thus be higher than the temperature of the saponified products to be conditioned. This is often conducive to production of a better conditioned product. On the other hand, the products of combustion may be cooler than the saponified masses, this being desirable in certain instances. Both systems are within the scope of the present invention.

In processes in which the cooling action in the separating zone is not sufficient to cool the saponified products to such an extent as to prevent formation of peroxides when exposed to the air, the present invention contemplates further cooling of these products during withdrawal thereof and before exposure to the atmosphere.

The introduction of products of combustion into the separating zone is of great utility in a process in which the saponifiable and saponifying materials are continuously introduced into a reaction zone, being therein heated and the reaction products being discharged into the separating zone. When such products of combustion are introduced into the separating zone, the heat supplied to the reaction zone may be materially less. It is an important object of the present invention to provide such a continuous process.

It is a further object of the invention to provide a novel method and apparatus in which the same products of combustion are used for heating the reaction zone and for conditioning the resulting products.

Another object of the invention is to provide a novel apparatus permitting ready control of the quantity of products of combustion entering the separating zone.

Further objects and advantages of the invention will be evident to those skilled in the art from the following description of an illustrative embodiment of the invention.

In the embodiment shown in the accompanying drawing one form of saponifying means and one form of conditioning means are illustrated. While various saponifying reactions can be performed in this apparatus, the illustrated embodiment will be described with particular reference to the formation of and conditioning of soap.

While various saponifying means can be utilized without departing from the spirit of the invention, the embodiment shown includes a proportioning-mixing means continuously supplying to a reaction zone of a heater 14 preliminarily mixed saponifiable and saponifying materials. In this capacity a tank 16 may contain the saponifiable material and may include suitable means for heating this material if desired. A valved pipe 17 conducts this saponifiable material to a pump 18 which discharges into a pipe 19. Similarly, a tank 20 may be provided to contain the saponifying material, this material being delivered through a valved pipe 21 to a pump 22 discharging into a pipe 23. The pumps 18 and 22 are driven at proportioned speeds through any suitable means. Diagrammatically this means is shown as including a motor 24, preferably of the variable-speed type, operatively connected to the pump 22 and to a cone pulley 25. Another cone pulley 26 is operatively connected to the pump 18, a belt 27 operatively connecting the cone pulleys. Any other means for proportionately controlling the speeds of the pumps 18 and 22 may be utilized.

The streams of saponifiable and saponifying materials respectively moving through the pipes 19 and 23 are brought into contact with each other to effect a mixing thereof. This may be accomplished by use of a mixer 30 providing a chamber into which the pipes 19 and 23 discharge. No mechanical mixing is needed at this point, though it can be utilized if desired. The mixture is passed through a pipe 31, preferably provided with temperature and pressure indicating means 32 and 33. It is then delivered to the heater 14.

The type of heater disclosed includes a shell 35 provided with a suitable stack 36. Disposed in this shell is a coil 40 forming an elongated reaction zone to which the preliminarily mixed products are delivered from the pipe 31. These products are heated during passage through this reaction zone by products of combustion moving upward exterior of the coil 40. A burner 41 may be utilized to supply these products of combustion. As it is desirable to control the amount of air or other combustion-supporting medium, I provide a pipe 42 including a valve 43 serving to supply this medium to the burner 41 in controlled quantity. Gas or other combustible material is supplied through a pipe 44 provided with a valve 45 so that the burner 41 is supplied with a combustible mixture including controlled quantities of combustible material and combustion-supporting material.

Further, the quantity of air or other combustion-supporting material supplied to the heating chamber defined by the shell 35, may be controlled by an adjustable venting means 48. This venting means is shown as including an annular ring 49 surrounding the flared lower portion of the shell 35 and providing openings which can be moved into or out of alignment with openings 50 formed by the shell 35. A handle 51 may be utilized to move the ring 49 in a path guided by channels 52 so that various quantities of air or other combustion-supporting material can be introduced into the shell 35. In some instances the pipe 42 can be dispensed with, allowing a controlled quantity of air to enter the shell 35 through the openings 50. In other instances these openings 50 can be eliminated, allowing the entire control of air or other combustion-supporting material to be effected by the valve 43.

A saponifying reaction takes place in the reaction zone formed by the coil 40, and the reaction products are moved through a pipe 55 to the conditioning means 11, this pipe providing suitable temperature and pressure indicating means 56 and 57.

In the embodiment shown the conditioning means includes a container 60 providing a separating zone 61 into which the reaction products are discharged. It is usually desirable to discharge the reaction products from the pipe 55 into the separating chamber 61 by use of a nozzle 62 which throttles the reaction products in such a way as to permit building up of considerable pressure in the reaction zone formed by the coil 40. The nozzle 62 may provide one or more orifices acting in this regard. However, in certain instances it is not essential to utilize such a nozzle. By lengthening the coil 40 or forming same of a pipe of smaller cross-sectional area, it is possible to build up considerable pressure in the reaction zone 40 due to the friction of the reaction products moving therethrough and through the pipe 55.

Extending into the separating zone 61, preferably at a position below the nozzle 62 if the reaction products are introduced into the upper end of this separating zone, is a pipe 65 supplying conditioning gases to this zone. As shown, this pipe communicates with the stack 36, in which instance the products of combustion will act as a conditioning gas. Suitable control means are preferably provided in the stack 36 and in the pipe 65 to control the relative quantities of products of combustion moving therethrough. Dampers 67 and 68 are shown in this capacity. I have also shown the pipe 65 as being provided with a downward extending portion 69 so that the products of combustion are discharged in a downward direction as indicated by the arrow 70.

It is usually desirable to withdraw the conditioning gas, such as the products of combustion, from the upper end of the separating zone 61 so that this conditioning gas moves upward as indicated by the arrows 71, counterflowing the saponified products which drop into this separating zone to a conical bottom 73 provided by the container 60. In some instances the conditioning gas can be allowed to discharge into the atmosphere, the pressure in the separating zone 61 being then only slightly above atmospheric pressure. However, the preferable structure includes a pipe 75 for withdrawing the conditioning gas, conducting this gas to a dust collector 76 serving to remove any saponified masses which may be entrained by the conditioning gas. This dust collector 76 may be of the cyclone type, the incoming gases being tangentially introduced into a closed container 77, the outgoing gases moving through a downward extending pipe 78 and through a discharge pipe 79. Any saponified masses separated in the container 77 may be removed through a pipe 80 provided with a valve 81 of suitable construction.

It is often desirable to forcibly withdraw the conditioning gases from the separating zone 61. This may be accomplished by providing a suitable pumping means in the pipes 75 or 79. As disclosed, this pumping means includes a fan 83 positioned in the pipe 75 and driven by a shaft 84 operatively connected to a motor or other drive means 85. Use of such a pumping means permits control of the pressure in the separating chamber 61, it being possible to reduce this pressure materially below atmospheric if desired.

The conditioned saponified products which move downward in the separating zone 61 and collect in the conical bottom 73 may be continuously or intermittently withdrawn. Continuous withdrawal is preferable in most instances, and I have shown a conveyor 87 serving this function. This conveyor 87 may include a housing 88 in which a screw 89 is positioned, this screw being rotated by any suitable means such as gears 90 and 91. This screw provides helically disposed vanes which extend outward into contact with the inner surface of the housing 88 so that when the screw is rotated in a proper direction the saponified products are moved rightward through this housing and through a discharge means 93 providing one or more orifices 94. If desired, these orifices 94 may be of smaller cross-sectional area than the housing 88 so that a back pressure may be developed on the advancing stream of saponified products.

Further cooling of the saponified products moving through the housing 88 may be accomplished by spraying water or other cooling medium on the exterior of this housing, or a jacket 95 may surround this housing, being supplied with a cooling medium through a pipe 96, this cooling medium discharging through a pipe 97.

As auxiliary features of the invention, it is within the scope of the present concept to provide any suitable agitating means in the separating chamber 61 to agitate the mass of saponified products in the lower end thereof to insure uniform delivery to the conveyor means 87. In addition, I have shown a pipe 100 communicating with the separating zone 61 and with the surrounding atmosphere and providing a suitable flow-control means 101 shown as comprising a damper or other valve means capable of completely eliminating any flow of air to the separating zone if desired. This means is invariably closed in the event the pressure in the separating zone chamber 61 is below atmospheric, and in the event it is desired to maintain in this zone an atmosphere substantially free of oxygen. However, if the pressure in the separating zone 61 is above atmospheric, a portion of the conditioning gas can be bled through the pipe 100. In other instances it is desirable to introduce a conditioning gas through this pipe 100 from any suitable source either alternatively or in conjunction with the products of combustion supplied to the pipe 65. For instance, steam or other conditioning gas may be introduced into the separating zone through the pipe 100 if desired, the flow being controlled by the means 101, or other inert gases or gases containing inappreciable amounts of oxygen can be thus introduced.

Considering by way of example saponification of a saponifiable material utilizing an aqueous solution of sodium hydroxide as the saponifying material, the operation of the apparatus hereinbefore described will be substantially as follows. Properly proportioned quantities of the saponifiable material and the aqueous solution will be withdrawn from the tanks 16 and 20 and preliminarily mixed before introduction into the coil 40. It is within the scope of the present invention to heat either or both of these materials prior to such introduction into the reaction zone, though this is not usually necessary unless the saponifiable material is of such character as to require application of heat to insure fluidity. Due to the back pressure developed by the nozzle 62 and by the friction of the materials passing through the coil 40, the pressure developed by the pumps 18 and 22 will usually be relatively high.

Only sufficient heat is supplied to the coil 40 to assist saponification. A very important feature of the present invention is that the quantity of heat supplied to the reaction zone may be materially less if the hot products of combustion are utilized as a conditioning gas in the separating chamber 61. However, the quantity of heat supplied to the reaction zone defined by the coil 40 will usually be sufficient to vaporize all or a part of the water at the pressure existing in this coil. Depending upon operating conditions, all or a portion of the unvaporized water will flash into steam when the reaction products are introduced into the separating chamber 61 by the nozzle 62. However, it should be distinctly understood that it is not necessary to have all of the water in vapor form in the separating chamber 61. In fact, in many instances it is desirable to operate at lower temperatures to permit a portion of the moisture to remain in the soap discharged into the separating chamber 61. It will thus be apparent that no specific temperatures and pressures can be set forth applicable to all processes. In general, however, the temperature of the reaction products in the pipe 55 may be between 250° F. and 450° F., the pressure being between 50 pounds per square inch and 150 pounds per square inch. While satisfactory operation is secured within these limits in most saponifying reactions, it should be understood that I am not definitely limited thereto, this range being set forth merely to illustrate temperatures and pressures at which most satisfactory results can be obtained.

The quantity of air or other combustion-supporting material supplied to the burner 41 or to the heating chamber inside the container 35 is carefully controlled so that the products of combustion will contain substantially no free oxygen.

For instance, the amount of air supplied may be just sufficient to support combustion, in which event the products of combustion will consist primarily of carbon dioxide and nitrogen, with substantially no oxygen present. On the other hand, it is entirely feasible to operate my process by supplying an insufficient quantity of air to support complete combustion, in which event carbon monoxide may be present in the products of combustion. Quantities of fuel and air in excess of those actually needed to heat the coil 40 to the desired temperature may be utilized to give sufficient quantities of products of combustion to perform the desired conditioning function.

The products of combustion may be introduced into the separating zone 61 in relatively hot condition, or they may be cooled before being thus used as a conditioning gas. Control of the temperature of the products of combustion will vary with the saponified product formed and with the nature of the conditioning desired in the separating chamber 61. In the embodiment illustrated the products of combustion will be relatively hot. The proportions of these products of combustion moving upward through the stack 36 and through the pipe 65 may be readily controlled by the dampers 67 and 68.

If a fat is used as the saponifiable material, it will be clear that the reaction products discharged from the nozzle 62 will include the saponified material (soap), water vapor, and glycerine. If temperatures in the reaction zone have been utilized which are insufficient to vaporize the glycerine, this glycerine will appear in the finished soap. As these reaction products are sprayed into the separating zone 61 by the nozzle 62 the saponified products are blanketed by the water vapors, if formed. This preliminary blanketing immediately after discharge from the nozzle 62 is often desirable. As the saponified masses spread in the separating zone 61, they are contacted by the rising stream of products of combustion. After being conditioned thereby, these saponified masses drop to the lower end of the container 60 and are withdrawn as previously described, being cooled during this withdrawal if desired. This conditioning may include heating, cooling, dehydrating, drying, or effecting a further saponifying reaction, as will be hereinafter described. If a nozzle 62 is utilized, there will be a considerable drop in pressure when the reaction products move therethrough, causing expansion and consequent cooling. If hot products of combustion are introduced into the separating zone, this cooling can be partially or completely counteracted. On the other hand, if the products of combustion are relatively cool, they can be used to effect a cooling action on the saponified masses. In either instance these products of combustion tend to dry these saponified masses.

If desired, the pressure in the separating chamber 61 may be at or near atmospheric pressure. In other instances it is desirable to maintain a lower pressure in this separating zone, in which event the pumping means such as the fan 83 may be utilized to forcibly withdraw the products of combustion from this zone, delivering these products to the dust collector 76 wherein any entrained saponified masses are separated.

It has previously been proposed to supply proportioned quantities of saponifiable and saponifying materials to the inlet end of a heated coil, the reaction products being discharged into the atmosphere. However, in such a process the drying of the soap has required high temperatures in the coil so that when the reaction products are discharged into the air at atmospheric temperature there will be sufficient heat in the soap itself to effect drying by contact with the cold air. While this is a very efficient way of drying, it requires considerably higher temperatures to be developed in the coil than are necessary in the present process. In certain instances these higher temperatures have been higher than desirable in the manufacture of certain soaps. The present process permits much lower temperatures to be developed in the reaction zone, a factor particularly desirable in making rosin soap or soap made from high unsaturated glycerides such as cotton oil, linseed oil, soya bean oil, corn oil, etc. So also, certain soaps have a tendency to form peroxides if exposed to the air or an oxygen-containing atmosphere while at high temperature. The present invention permits cooling of the saponified masses either in the separating chamber 61 or in the conveyor means 78, or both, prior to such time as these saponified masses are exposed to the air.

If the saponifying reaction is effected through the presence of sodium carbonate in aqueous solution as a saponifying material, the resulting reaction will not go to completion in the coil 40. This reaction liberates carbon dioxide, and if this carbon dioxide is confined in the presence of the reaction products, it will combine with the water to form carbonic acid which in turn will enter into certain side reactions which prevent the saponifying reaction from going to completion. However, with the apparatus herein disclosed the saponifying reaction can be made to go to completion by discharging the intermediate reaction products from the coil 40 into the separating zone 61. Here the carbon dioxide can escape and be withdrawn with the products of combustion or other conditioning gas. In this instance the saponifying reaction will take place partly in the coil 40 and partly in the separating zone 61. The hot products of combustion are very advantageous in supplying heat and furthering the completion of this saponifying reaction.

Further, if an aqueous solution of sodium carbonate is used as the saponifying material, the carbon dioxide delivered to or formed immediately after discharge from the nozzle 62 will serve as an additional blanketing agent for the saponified masses, assisting any steam formed in this regard.

One of the important features of the present invention lies in the exclusion of substantial quantities of oxygen from the separating chamber 61. The term "oxygen-free" as herein used has reference to an atmosphere or environment in which is present substantially no free oxygen which could combine with the saponified masses in a deleterious manner. The introduction of a conditioning gas of substantially oxygen-free character thus permits the desired conditioning of the products without forming peroxides, etc., which might result from exposure to an atmosphere containing free oxygen.

Another important feature of the present invention lies in the combined use of the reaction means and the conditioning means when an appropriate conditioning gas is supplied to the latter. The joint use of these means permits lower temperatures and pressures to be maintained in the reaction zone, resulting in the advantages hereinbefore set forth. It should be distinctly understood, however, that I am not limited to the particular reaction means disclosed. Various other reaction chambers can be substituted, as can also various other types of soap-making equipment.

Further, it is not essential in all instances to utilize products of combustion as the conditioning gas, nor to use products of combustion for this purpose which have previously been utilized for heating the reaction zone, though this combination has been found particularly effective. If desired, the reaction zone can be separately heated, or products of combustion from any suitable source other than the heater 14 may be utilized for conditioning the products.

Various other changes and modifications will be apparent to those skilled in the art and can be made without departing from the spirit of the invention set forth in the appended claims.

I claim as my invention:

1. A method of conditioning a saponified product, which method includes the steps of: maintaining in a separating zone a substantially oxygen-free atmosphere by continuously introducing a substantially oxygen-free conditioning gas comprising substantial quantities of constituents other than water vapor into one portion of said separating zone and continuously withdrawing said gas from another portion of said separating zone; continuously spraying said saponified product while in heated condition into said substantially oxygen-free atmosphere at a third position while at such temperature that contact with oxygen would result in deleterious action on the saponified product thus conditioning said saponified product; and separately withdrawing the conditioned saponified product and the conditioning gas from said zone.

2. A method of conditioning a saponified product, which method includes the steps of: continuously introducing small hot masses of said saponified product into a separating zone in a blanket of steam; separately and continuously introducing into said zone a substantially oxygen-free gas comprising substantial quantities of constituents other than water vapor to condition said masses of said saponified product and prevent oxygen-induced reactions; and separately withdrawing said gas and the conditioned product from said zone.

3. A method of conditioning a saponified product, which method includes the steps of: continuously introducing small hot masses of said saponified product into a separating zone; separately and continuously introducing into said zone a substantially oxygen-free gas to condition said masses of said saponified product and prevent oxygen-induced reactions; continuously withdrawing said gas from said separating zone; separately withdrawing said conditioned product from said separating zone while maintaining same out of contact with the atmosphere; cooling said conditioned product out of contact with the atmosphere and after withdrawal from said separating zone; and exposing said conditioned product to the atmosphere only after cooling to such an extent that said oxygen-induced reactions will not result.

4. A method of conditioning a saponified product, which method includes the steps of: continuously introducing small masses of said saponified material into a separating zone while in heated condition; burning a fuel and controlling the amount of combustion-supporting oxygen supplied to the fuel to produce products of combustion which are substantially oxygen-free, continuously introducing into said separating zone said products of combustion which are substantially oxygen-free to condition said masses of saponified material; and separately withdrawing said products of combustion and said saponified product from said separating zone.

5. A method as defined in claim 4, in which said small masses of saponified material introduced into said separating zone are in heated condition but are at a temperature below the temperature of said products of combustion.

6. A method of conditioning a saponified product, which method includes the steps of: continuously introducing small masses of said saponified product into a separating zone while in heated condition; continuously introducing into said separating zone products of combustion to condition said masses; continuously withdrawing said products of combustion from said separating zone at such rate as to maintain a partial vacuum therein; separately and continuously withdrawing said conditioned product from said separating zone while maintaining same out of contact with the atmosphere and without impairing said partial vacuum; cooling said conditioned product out of contact with the atmosphere; and exposing said conditioned product to the atmosphere only after cooling to such an extent that oxygen-induced reactions will not result.

7. A continuous method of forming a saponified product from a saponifiable material by reaction therewith of a saponifying material, which method includes the steps of: continuously flowing into a reaction zone proportioned quantities of said saponifiable and saponifying materials; heating said reaction zone to facilitate saponification and to form saponified reaction products; continuously introducing a stream of said reaction products into a separating zone maintained at lower pressure than said reaction zone whereby the saponified products are sprayed into said zone and are blanketed by steam as they spread in said zone; and circulating products of combustion through said zone, said products of combustion being substantially oxygen-free.

8. A method of forming a saponified product from a saponifiable material by reaction therewith of an aqueous solution of sodium carbonate, which method includes the steps of: continuously introducing into one end of an elongated reaction zone proportioned quantities of said saponifiable material and said aqueous solution of sodium carbonate and applying heat to liberate carbon dioxide which is confined in said elongated reaction zone to move along with the reaction products thereby preventing completion of the saponifying reaction in said elongated reaction zone; continuously moving the intermediate reaction products formed in said reaction zone from the other end thereof and introducing same into an enlarged zone in which the pressure is lower than in said reaction zone and from which the carbon dioxide can escape thereby continuing the saponifying reaction to completion in said enlarged zone; continuously circulating through said enlarged zone to contact the saponified product while at such temperature that exposure to oxygen would result in deleterious reactions a conditioning gas which is substantially oxygen-free and which carries said carbon dioxide from said enlarged zone; and separating the saponified product from said conditioning gas and from said carbon dioxide.

9. A method as defined in claim 8 in which said conditioning gas comprises hot products of combustion formed by burning a fuel and controlling the amount of combustion-supporting oxygen supplied to the fuel to produce products of combustion which are substantially oxygen-free.

10. A method as defined in claim 8 including the step of cooling the saponified product after withdrawal from said enlarged zone and before exposure to the atmosphere to such degree that oxygen-induced reactions will not result upon such exposure to the atmosphere.

11. A method as defined in claim 8 in which said conditioning gas comprises hot products of combustion, and including the step of cooling the saponified product before exposure to the atmosphere to such degree that oxygen-induced reactions will not result upon such exposure to the atmosphere.

12. A method of forming a saponified product, which method includes the steps of: continuously flowing into an elongated reaction zone a mixture of saponifiable and saponifying materials; heating said reaction zone by moving hot products of combustion therearound to effect a saponifying reaction in said reaction zone; introducing the reaction products into a separating zone to separate the saponified product from the remainder of said reaction products; and circulating through said separating zone at least a portion of said products of combustion from which heat has been extracted by the heating of said reaction zone, whereby said saponified product is conditioned by said products of combustion.

13. In combination: walls defining a reaction zone; means delivering saponifiable and saponifying materials to said reaction zone; a burner supplying products of combustion heating said reaction zone; a container producing a separating zone; means for delivering at least a part of said products of combustion to said separating zone; means for introducing the products from said reaction zone into said separating zone; means for removing the products of combustion from said separating zone; a screw conveyor for removing saponified material from said separating zone without interruption to the concurrent removal of said products of combustion; and means for cooling said saponified material while being advanced by said screw conveyor.

14. In combination: walls defining a reaction zone; a container providing a separating zone; heating means for heating said reaction zone and including a burner creating products of combustion which externally heat said reaction zone and including a discharge means for said products of combustion; pipe means communicating with said discharge means and supplying at least a part of said products of combustion to said separating zone; and means for introducing a stream of material from said reaction zone into separating zone.

15. A combination as defined in claim 14 in which a portion of said discharge means extends beyond the section where said pipe means communicates with said discharge means to form a flue, and including means varying the relative proportions of said products of combustion moving through said flue and said separating zone.

16. A method of conditioning a saponified product which method includes the steps of: continuously introducing into a separating zone a stream of material including the saponified product and water in vapor state whereby the water vapor tends to separate from and blanket the saponified product in said chamber and while said saponified product is at such elevated temperature that contact with oxygen would result in deleterious reactions; forming products of combustion by burning a fuel and controlling the combustion-supporting oxygen supplied to the fuel to form combustion products containing insufficient oxygen to react deleteriously with the saponified product; continuously introducing these products of combustion into said chamber to further blanket said saponified product as it separates from the water vapor; and continuously removing the products of combustion together with said water vapor from said chamber.

17. A method of forming a saponified product from a saponifiable material by reaction therewith of a saponifying material, which method includes the steps of: saponifying proportioned quantities of said materials and heating a stream of the products containing soap and water to such an extent that at least a part of the water is in vapor form; spraying the resulting stream into a separating zone; circulating through said separating zone hot products of combustion which are substantially oxygen-free to condition the saponified product; separating the conditioned saponified product from the products of combustion and the steam resulting from the water in said stream of products; continuously withdrawing said products of combustion and said steam from the separating zone; and continuously withdrawing said saponified product from said separating zone.

18. In combination: means defining an elongated heating zone; means for continuously supplying materials to said heating zone; means for heating said elongated heating zone to heat the materials therein; a container providing a separating zone; a fuel-burning heater for forming products of combustion; means for introducing said products of combustion into said separating zone; means for spraying the stream of products from said elongated heating zone into said separating zone; means for continuously withdrawing from said separating zone the products of combustion and any gases separating from the products of said stream; and a screw conveyor for separately and continuously removing the remaining products from said separating zone.

19. A combination as defined in claim 18 including means for cooling the remaining products removed from said separating zone while in said screw conveyor and out of contact with the atmosphere.

20. A method of condition a saponified product, which method includes the steps of: forming in a zone closed from the atmosphere a hot stream containing a saponified product which exists at such elevated temperature that exposure to the air would result in deleterious reactions between the oxygen of the air and the saponified product; separating vapor from said stream by releasing same into a separating zone; maintaining a substantially oxygen-free atmosphere in said separating zone by introducing and withdrawing therefrom to counterflow the stream in said separating zone products of combustion formed by burning a fuel; and controlling the amount of combustion-supporting oxygen used in the fuel-burning operation to produce products of combustion which are substantially oxygen-free, said products being introduced into said separating zone.

21. A method of conditioning a saponified product, which method includes the steps of: continuously flowing said product through an elongated zone; heating said elongated zone by moving hot products of combustion therearound to heat these products to a high temperature; introducing the heated products into an enlarged zone; and circulating through said enlarged zone at least a portion of said products of combustion from which heat has been extracted by the heating of said elongated zone, whereby said saponified product is conditioned by said products of combustion while in said enlarged zone.

22. A method of conditioning a saponified product, which method includes the steps of: spraying a heated stream of the saponified product and a vaporizable material into a separating zone; burning a fuel at a position spaced from said separating zone while restricting the amount of oxygen supplied to the fuel to produce products of combustion which are substantially oxygen-free; advancing said products of combustion to said separating zone while cooling same during said advancement and excluding oxygen therefrom whereby cooled products of combustion substantially free of oxygen are introduced into said separating zone to condition said saponified product and assist in removing said vaporizable material in vapor state; removing vapors and said products of combustion from said separating zone; and separately removing the conditioned saponified product from said separating zone.

23. In combination: walls defining a separating zone; means for spraying a saponified product into said separating zone; means for continuously delivering products of combustion to said separating zone to facilitate separation of vapors from said saponified product; withdrawal means for withdrawing the saponified product from said separating zone; and agitating means in said separating zone for facilitating delivery of said saponified product to said withdrawal means.

BENJAMIN H. THURMAN.

CERTIFICATE OF CORRECTION.

Patent No. 2,193,786. March 12, 1940.

BENJAMIN H. THURMAN.

It is hereby certified that error appears in the printed specification of the above numbered patent requiring correction as follows: Page 6, first column, line 38, claim 13, for the word "producing" read providing; and second column, line 56, claim 20, for "condition" read conditioning; and that the said Letters Patent should be read with this correction therein that the same may conform to the record of the case in the Patent Office.

Signed and sealed this 9th day of April, A. D. 1940.

Henry Van Arsdale,
Acting Commissioner of Patents.